US012738493B2

(12) United States Patent
Zhang et al.

(10) Patent No.: US 12,738,493 B2
(45) Date of Patent: Sep. 15, 2026

(54) PREPARATION METHOD FOR LITHIUM IRON PHOSPHATE CATHODE MATERIAL AND APPLICATION THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Shiqing Zhang, Foshan (CN); Dingshan Ruan, Foshan (CN); Shenghe Tang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 621 days.

(21) Appl. No.: 18/219,122

(22) Filed: Jul. 7, 2023

(65) Prior Publication Data

US 2023/0352684 A1 Nov. 2, 2023

Related U.S. Application Data

(63) Continuation of application No. PCT/CN2021/142431, filed on Dec. 29, 2021.

(30) Foreign Application Priority Data

Jan. 21, 2021 (CN) ........................ 202110081821.2

(51) Int. Cl.
*H01M 4/58* (2010.01)
*C01B 25/45* (2006.01)
(Continued)

(52) U.S. Cl.
CPC ........... *H01M 4/5825* (2013.01); *C01B 25/45* (2013.01); *H01M 4/366* (2013.01); *H01M 4/60* (2013.01);
(Continued)

(58) Field of Classification Search
CPC .................................................. H01M 4/5825
See application file for complete search history.

(56) References Cited

FOREIGN PATENT DOCUMENTS

CN 111115610 * 5/2020

OTHER PUBLICATIONS

International Search Report of PCT Patent Application No. PCT/CN2021/142431 issued on Mar. 25, 2022.

* cited by examiner

*Primary Examiner* — William D Young
(74) *Attorney, Agent, or Firm* — Westbridge IP LLC

(57) ABSTRACT

The present invention provides a preparation method and application of lithium iron phosphate cathode material, comprising the following steps: (1) Dry mixing an iron source, a phosphorus source, a lithium source, a carbon source and additives and fine grinding to obtain a mixed material; (2) Performing first calcination to the mixed material, and then pulverize to obtain the pulverized material; (3) Perform the second calcination to the pulverized material, while introducing a gasifiable organic carbon source, and then cooling to obtain a lithium iron phosphate cathode material. The invention uses high-efficiency mixing equipment for a one-step mixing and fine grinding of the raw materials, followed by the first calcination and pulverizing,
(Continued)

and then performing a second calcination. The gasifiable organic carbon source is used to supplement carbon by forming a carbon coating, so that it has a better carbon coating layer and particle morphology.

7 Claims, 1 Drawing Sheet

(51) Int. Cl.

| | |
|---|---|
| ***H01M 4/02*** | (2006.01) |
| ***H01M 4/36*** | (2006.01) |
| ***H01M 4/60*** | (2006.01) |
| ***H01M 10/0525*** | (2010.01) |

(52) U.S. Cl.

CPC ..... *H01M 10/0525* (2013.01); *C01P 2004/03* (2013.01); *C01P 2004/61* (2013.01); *C01P 2004/80* (2013.01); *C01P 2006/40* (2013.01); *H01M 2004/021* (2013.01); *H01M 2004/028* (2013.01)

PREPARATION METHOD FOR LITHIUM IRON PHOSPHATE CATHODE MATERIAL AND APPLICATION THEREOF

CROSS-REFERENCE TO RELATED APPLICATIONS

The present application is a continuation application of PCT application No. PCT/CN2021/142431 filed on Dec. 29, 2021, which claims the benefit of Chinese Patent Application No. 202110081821.2 filed on Jan. 21, 2021. The contents of all of the aforementioned applications are incorporated by reference herein in their entirety.

TECHNICAL FIELD

The invention relates to the technical field of lithium ion battery material preparation, and in particular to a Preparation method of lithium iron phosphate cathode material and application thereof.

BACKGROUND

Since the emergence of lithium-ion battery materials, their high capacity and reproducibility provide prospects of new energy in the new century. As a positive electrode material with high safety, good cycle performance and environmental friendliness, lithium iron phosphate has always been a popular research object in the lithium battery industry. Its application fields involve various commercial vehicle batteries, energy storage base stations, and many electrical equipment, etc. However, lithium iron phosphate material has some shortcomings: the electronic conductivity and ion conductivity are low, and it shows poor rate performance when used as a cathode material for lithium ion batteries. Therefore, to improve the performance of lithium iron phosphate cathode materials, many companies and people in the industry have also devoted themselves to improve it, but often fail to balance high performance and low cost. Therefore, the enterprises face obstacles in the industrialization and marketization of lithium iron phosphate cathode materials.

The related technology records a preparation method of a lithium iron phosphate cathode material, which prepares the material using a wet process including precursor prefabrication, compound grinding, drying, sintering and other process steps. Another prior art records a low-cost lithium iron phosphate, in which an iron sheet is dissolved in an acid solution, after a reaction with supplemented raw materials, steps spray drying, sintering, crushing and sieving are carried out to obtain the material. From the perspective of the technologies such as the above, although the material properties can be promoted and improved, the wet process is relatively cumbersome, with more control points, and the overall cost cannot be significantly reduced. In addition, there are some less popular preparation methods such as dry-mixing and all-solid-phase process methods, although their processes are simple, the stability of the obtained material is not satisfied, and the performance is also poor. Therefore, the comprehensive matching of performance and cost of lithium iron phosphate is still the competitive focus among the enterprises.

SUMMARY OF THE INVENTION

The purpose of the present invention is to provide a preparation method and application of lithium iron phosphate cathode material. The method of the present invention is based on a low-cost route, aim to improve the material performance and create a low-cost process suitable for preparing high-performance lithium iron phosphate cathode materials. The method makes lithium iron phosphate easier to industrialize and has higher market competitiveness, which is conducive to promoting the development of the lithium battery industry and the application and popularization of new energy materials.

In order to achieve the above objectives, the present invention adopts the following technical solutions:

A preparation method of a lithium iron phosphate cathode material, comprising the following steps:

(1) dry mixing an iron source, a phosphorus source, a lithium source, a carbon source and an additive, and refining to obtain a mixture;

(2) subjecting the mixture to first calcination, followed by pulverizing to obtain a pulverized material;

(3) subjecting the pulverized material to second calcination, during which a gasifiable organic carbon source is introduced for coating; cooling to obtain the lithium iron phosphate cathode material; the gasifiable organic carbon source is one or more selected from the group consisting of acetylene, methane, ethane, propane, methanol, ethanol, ethylene glycol, isopropanol, glycerol, acetone, butanone and 2-pentanone.

Preferably, the dry mixing is carried out with a high-efficiency mixing equipment.

In some preferred embodiments of the present invention, in step (1), the iron source, phosphorus source and lithium source may be composite raw materials, preferably one or more of iron phosphate, iron pyrophosphate, lithium phosphate, lithium metaphosphate or lithium dihydrogen phosphate; it can also be a single raw material, and the single type of iron source is preferably one or more of iron powder, iron oxide, iron hydroxide, iron nitrate, iron oxalate or iron acetate; the single phosphorus source is preferably one or more of ammonium monohydrogen phosphate, ammonium dihydrogen phosphate or triammonium phosphate; the single lithium source is preferably one or more of lithium carbonate, lithium acetate, lithium hydroxide or lithium nitrate.

In some preferred embodiments of the present invention, in step (1), the molar ratio of iron, phosphorus and lithium in the iron source, phosphorus source and lithium source are 1:(0.95-1.10):(0.97-1.12).

In some preferred embodiments of the present invention, in step (1), the introduced amount of the carbon source is (3-15) % of the total mass of the iron source, the phosphorus source and the lithium source.

In some preferred embodiments of the present invention, in step (1), the introduced amount of the additive is (0.02-0.80) % of the total mass of the iron source, phosphorus source and lithium source.

In some preferred embodiments of the present invention, in step (1), the mixed material has a median particle size (D50)≤100 μm.

In some preferred embodiments of the present invention, in step (1), the carbon source is one or more of sucrose, glucose, oxalic acid, maltose, starch, cellulose, polyvinyl alcohol, polyethylene glycol, polyacrylic acid, Tween, graphene or carbon nanotubes.

In some preferred embodiments of the present invention, in step (1), the additive is one or more of titanium oxide, aluminum oxide, magnesium oxide, magnesium carbonate, ammonium metavanadate, ammonium fluoride, tetrabutyl titanate, nonahydrate chromium nitrate, nickel oxide, barium nitrate or barium carbonate.

In some preferred embodiments of the present invention, in step (2), the first calcination is carried out at a temperature of 600° C.-800° C. with a heating rate of 1 to 10° C./min under an inert atmosphere, and holding the temperature for 4-15 h.

In some preferred embodiments of the present invention, in step (2), the crushed material has a median particle size (D50) of 0.5 μm-10 μm.

In some preferred embodiments of the present invention, in step (3), the second calcination is carried out at a temperature of 600-850° C. with a heating rate of 2-15° C./min under an inert atmosphere, and holding the temperature for 4-15 h.

In some preferred embodiments of the present invention, in step (3), the gasifiable organic carbon source is one or more of acetylene, methane, ethane, propane, methanol, ethanol, ethylene glycol, isopropanol, glycerin, acetone, butanone or 2-pentanone.

In some preferred embodiments of the present invention, in step (3), the mass ratio of the gasifiable organic carbon source to the pulverized material is (0.02-0.5):1.

The present invention also provides an application of the above-mentioned preparation method in the preparation of lithium ion batteries.

Advantages of the present invention:

(1) The present invention uses a high-efficiency mixing equipment to perform a one-step mixing and refinement of raw materials, after a first calcination and pulverizing, performing a second calcination in presence of a gasifiable organic carbon sources to supplement carbon coating, so that the material has a carbon coating and better morphology. The performance of the obtained material is improved. Compared with the similar one on the market, the performance has been greatly improved. The specific discharge capacity at 0.1 C can reach more than 157 mAh/g, and the specific discharge capacity at 2.0 C can reach 140 mAh/g. The capacity retention rate after 100 cycles at 0.1 C reaches more than 98%, which can meet the general requirements of high-performance lithium iron phosphate batteries.

(2) This method is suitable for a variety of cheap raw materials, and the preparation process is simple and easy to operate. Compared with the commonly used wet process on the market, the two high energy consumption process points of wet grinding and spray drying are eliminated. The cost is estimated to be reduced by more than 15%, so it has stronger market competitiveness.

(3) The process method starts from a low-cost route, and ensures that the performance of the lithium iron phosphate cathode material can be optimized and improved, which has important guiding significance for promoting the rapid development of the lithium battery industry and the new material industry.

BRIEF DESCRIPTION OF DRAWINGS

The above and/or additional aspects and advantages of the present invention will become obvious and easy to understand from the description of the embodiments in conjunction with the following drawings, in which.

DETAILED DESCRIPTION

Figure 1:
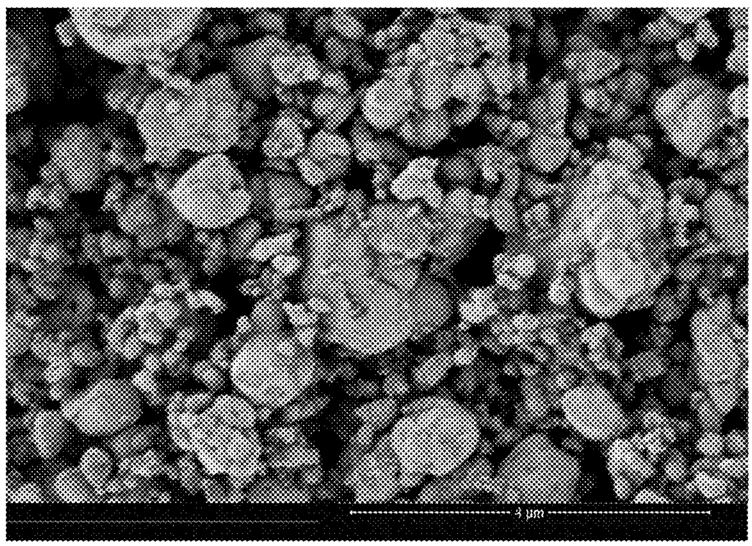
FIG. 1 is an SEM image of the material of Example 3.

In order to make technical solutions of the invention more clearly understood by those skilled in the art, the following examples are listed for explanation. It should be pointed out that the following examples are not intended to limit the protection scope claimed by the invention.

Example 1

A preparation method of a lithium iron phosphate cathode material, comprising the following steps:

(1) Weighing iron oxalate, ammonium dihydrogen phosphate, and lithium hydroxide in a Fe:P:Li molar ratio of 1:1.03:1.07, and adding 4.5% glucose and 2.36% polyacrylic acid as a carbon source, then adding 0.08% of titanium oxide and 0.10% of barium nitrate as additives; subjecting above components to a high-efficiency mixer to perform mixing and refining to obtain a mixture having a particle size ($D_{50}$) of 35 μm;

(2) The mixture is heated to a temperature of 650° C. at a rate of 3° C./min in a pure nitrogen atmosphere for first calcination and holding the temperature for 5 h, and after discharging, a resulting product is subjected to jet milling to obtain a pulverized material having a particle size ($D_{50}$) of 1.2 μm;

(3) The pulverized material is subjected to second calcination at a temperature of 720° C. with a heating rate of 5° C./min and holding the temperature for 8 h, while 140 g/kg (ethanol: pulverized material) of ethanol is introduced, and cooling and discharging to obtain a high-performance lithium iron phosphate cathode material.

Example 2

A preparation method of a lithium iron phosphate cathode material, comprising the following steps:

(1) Weighing iron phosphate, lithium carbonate, and diammonium phosphate in a Fe:P:Li molar ratio of 1:1.04:1.09, and adding 6.5% sucrose and 4.6% polyvinyl alcohol as a carbon source, then adding 0.24% of ammonium metavanadate and 0.22% of chromium nitrate nonahydrate as additives; subjecting above components to a high-efficiency mixer to perform mixing and fine grinding to obtain a mixture having a particle size ($D_{50}$) of 23 μm;

(2) The mixture is heated to a temperature of 690° C. at a rate of 4° C./min in a pure nitrogen atmosphere for first calcination and holding the temperature for 6 h, and after discharging, a resulting product is subjected to jet milling to obtain a pulverized material having a particle size ($D_{50}$) of 1.4 μm;

(3) The pulverized material is subjected to second calcination at a temperature of 740° C. with a heating rate of 6.5° C./min and holding the temperature for 8 h, while 185 g/kg (ethylene glycol: pulverized material) of ethylene glycol is introduced, and cooling and discharging to obtain a high-performance lithium iron phosphate cathode material.

Example 3

A preparation method of a lithium iron phosphate cathode material, comprising the following steps:

(1) Weighing iron phosphate and lithium hydroxide in a Fe:P:Li molar ratio of 1:1.06:1.10, and adding 5.5% sucrose and 3.5% polyethylene glycol and 1.2% oxalic acid as a carbon source, then adding 0.13% of titanium oxide and 0.16% of magnesium oxide as additives; subjecting above components to a high-efficiency mixer to perform mixing and fine grinding to obtain a mixture having a particle size ($D_{50}$) of 55 μm;

(2) The mixture is heated to a temperature of 670° C. at a rate of 5° C./min in a pure nitrogen atmosphere for first calcination and holding the temperature for 5 h, and after discharging, a resulting product is subjected to jet milling to obtain a pulverized material having a particle size ($D_{50}$) of 0.8 μm;

(3) The pulverized material is subjected to second calcination at a temperature of 745° C. with a heating rate of 8° C./min and holding the temperature for 6 h, while 125 g/kg (methanol: pulverized material) of methanol is introduced, and cooling and discharging to obtain a high-performance lithium iron phosphate cathode material.

FIG. 1 is an SEM image of the lithium iron phosphate cathode material of this embodiment. The figure shows that material exhibits regular and compact microscopic particles having a carbon coating layer of good uniformity, which plays an important role in stabilizing performance.

Example 4

A preparation method of a lithium iron phosphate cathode material, comprising the following steps:

(1) Weighing iron nitrate, lithium phosphate, and ammonium dihydrogen phosphate in a Fe:P:Li molar ratio of 1:1.01:1.06, and adding 5.6% starch and 4.8% Polyethylene glycol and 0.5% tween 80 as a carbon source, then adding 0.26% of ammonium metavanadate and 0.15% magnesium oxide as additives; subjecting above components to a high-efficiency mixer to perform mixing and fine grinding to obtain a mixture having a particle size ($D_{50}$) of 30 μm;

(2) The mixture is heated to a temperature of 700° C. at a rate of 5° C./min in a pure nitrogen atmosphere for first calcination and holding the temperature for 5 h, and after discharging, a resulting product is subjected to jet milling to obtain a pulverized material having a particle size ($D_{50}$) of 0.9 μm;

(3) The pulverized material is subjected to a second calcination at a temperature of 750° C. with a heating rate of 5° C./min and holding the temperature for 7 h, while 140 g/kg (acetone: pulverized material) of acetone is introduced, and cooling and discharging to obtain a high-performance lithium iron phosphate cathode material.

Example 5

A preparation method of a lithium iron phosphate cathode material, comprising the following steps:

(1) Weighing iron oxide, ammonium dihydrogen phosphate, lithium carbonate in a Fe:P:Li molar ratio of 1:0.95:1.05, and adding 6.5% glucose and 3.8% Polyethylene glycol as a carbon source, then adding 0.11% of titanium oxide and 0.24% of barium carbonate as additives; subjecting above components to a high-efficiency mixer to perform mixing and fine grinding to obtain a mixture having a particle size ($D_{50}$) of 25 μm;

(2) The mixture is heated to a temperature of 700° C. at a rate of 3° C./min in a pure nitrogen atmosphere for first calcination and holding the temperature for 7 h, and after discharging, a resulting product is subjected to jet milling to obtain a pulverized material having a particle size ($D_{50}$) of 1.1 μm;

(3) The pulverized material is subjected to second calcination at a temperature of 745° C. with a heating rate of 5° C./min and holding the temperature for 8 h, while 155 g/kg (ethanol: pulverized material) of ethanol is introduced, and cooling and discharging to obtain a high-performance lithium iron phosphate cathode material.

Performance Testing

The electrical performance test is performed according to the following method: weigh 2~5 g of the lithium iron phosphate cathode material prepared in Example 1-5 and the corresponding PVDF (polyvinylidene fluoride), SP carbon in a mass ratio of 90:6:4 and prepared a slurry with NMP (N-methylpyrrolidone) as a dispersant. A flat aluminum foil was coating with the slurry, baked in an oven to dryness, and pressed into a positive electrode sheet with a diameter of 15 mm after rolling. A button battery was assembled in an inert gas glove box, while a lithium metal sheet is used as negative electrode material, polypropylene microporous membrane is used as separator, and 1 mol/L lithium hexafluorophosphate dissolved in a mixture of ethylene carbonate and diethyl carbonate is used as electrolyte. The button battery testing was carried out under a controlled test voltage range between 2.0V and 3.8V.

The test results are shown in Table 1.

TABLE 1

| Example | First discharge capacity at 0.1 C (mAh/g) | First charge-discharge efficiency at 0.1 C (%) | Discharge capacity at 2 C (mAh/g) | Capacity retention rate after 100 cycles at 0.1 C (%) |
|---|---|---|---|---|
| 1 | 157.4 | 98.68 | 139.8 | 98.1 |
| 2 | 158.8 | 99.04 | 141.5 | 97.8 |
| 3 | 159.6 | 99.12 | 141.9 | 98.6 |
| 4 | 158.6 | 98.89 | 140.7 | 98.3 |
| 5 | 157.0 | 98.15 | 140.3 | 97.9 |
| Commercial product | 155.8 | 96.80 | 125.4 | 97.3 |

It can be seen from Table 1 that the electrical performance of the lithium iron phosphate cathode material prepared by the present invention is better than that of the commercial product, and the discharge specific capacity at a rate of 2.0C is significantly higher than that of the commercial product, indicating that the method simplifies the process and reduces the cost while still ensured that the performance of the lithium iron phosphate cathode material is optimized and improved.

Figure 2:
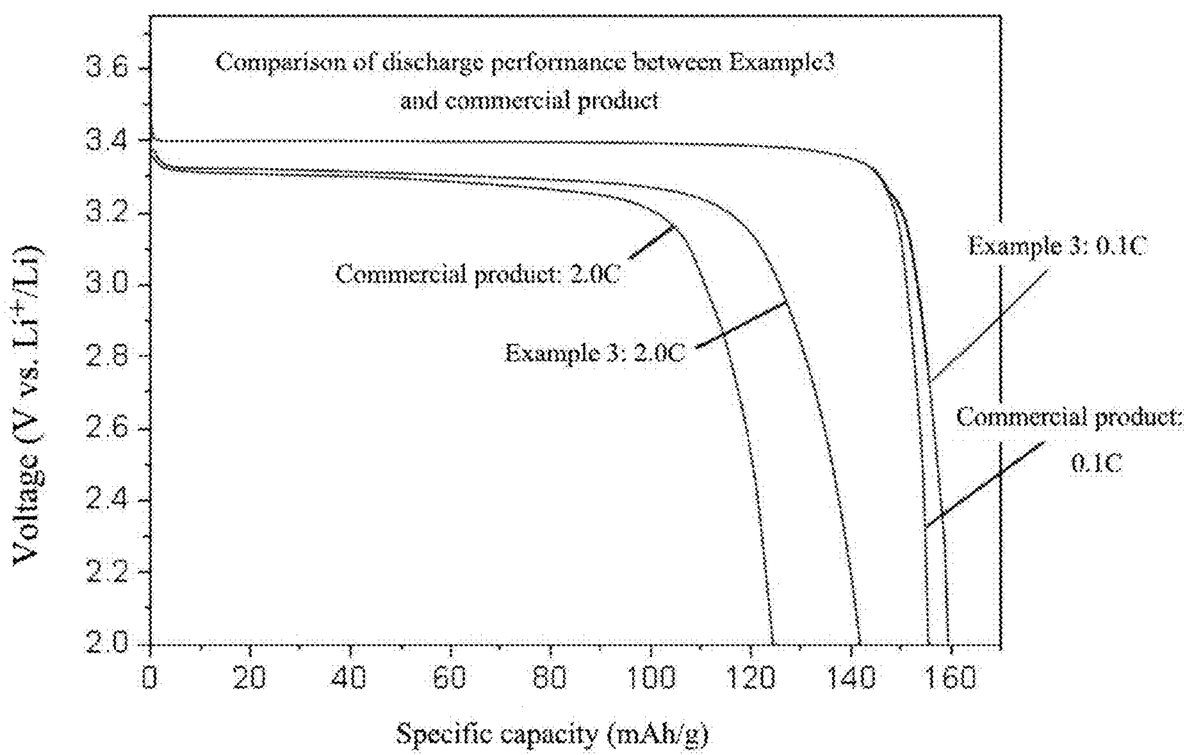
FIG. 2 is a comparison diagram of the discharge curves of the material of Example 3 and the marketed products at different rates.

FIG. 2 is a comparison diagram of the discharge curves of Example 3 and the marketed product at different rates. It can be seen from the figure that the material prepared by the present invention has better electrical properties, that is, higher specific capacity and better rate performance.

The preparation method and application of a lithium iron phosphate cathode material provided by the invention have been described in detail above. Specific examples are used herein to illustrate the principles and implementation of the invention. The above description of examples is only for the purpose of helping understand methods and core concepts of the invention, including best modes, and also enables any person skilled in the art to practice the invention, including manufacture and use of any device or system, and implementation of any combined methods. It should be noted that several improvements and modifications can be made by those skilled in the art to the invention without departing from the principles of the invention, which improvements and modifications also fall within the protection scope claimed by the claims. The protection scope of the invention is defined by the claims and may include other embodiments that can be thought of by those skilled in the art. If these other embodiments have structural elements that are not different from the literal expression of the claims, or if they include equivalent structural elements that are not substantially different from the literal expression of the claims, these other embodiments should also be included within the scope of the claims.

The invention claimed is:

1. A preparation method for a lithium iron phosphate cathode material, comprising the following steps:

(1) dry mixing an iron source, a phosphorus source, a lithium source, a carbon source and an additive, and refining to obtain a mixed material;

(2) subjecting the mixed material to first calcination, followed by pulverizing to obtain a pulverized material; in step (2), the first calcination is carried out at a temperature of 600° C.-800° C. with a heating rate of 1-10° C./min under an inert atmosphere, the temperature is held for 4-15 h; the pulverized material has a median particle size of 0.5 μm-10 μm;

(3) subjecting the pulverized material to second calcination, during which a gasifiable organic carbon source is introduced for coating; cooling to obtain the lithium iron phosphate cathode material; the gasifiable organic carbon source is one or more selected from the group consisting of acetylene, methane, ethane, propane, methanol, ethanol, ethylene glycol, isopropanol, glycerol, acetone, butanone and 2-pentanone.

2. The preparation method according to claim 1, wherein in step (1), an amount of the carbon source is (3-15) % of a total mass of the iron source, the phosphorus source and the lithium source.

3. The preparation method according to claim 1, wherein in step (1), the mixed material has a median particle size of ≤100 μm.

4. The preparation method according to claim 1, wherein in step (1), the carbon source is one or more selected from the group consisting of sucrose, glucose, oxalic acid, maltose, starch, cellulose, polyvinyl alcohol, polyethylene glycol, polyacrylic acid, tween, graphene and a carbon nanotube.

5. The preparation method according to claim 1, wherein in step (1), the additive is one or more selected from the group consisting of titanium oxide, aluminum oxide, magnesium oxide, magnesium carbonate, ammonium metavanadate, ammonium fluoride, tetrabutyl titanate, nonahydrate chromium nitrate, nickel oxide, barium nitrate and barium carbonate.

6. The preparation method according to claim 1, wherein in step (3), the second calcination is carried out at a temperature of 600-850° C. with a heating rate of 2-15° C./min under an inert atmosphere, the temperature is held for 4-15 h.

7. The preparation method according to claim 1, wherein in step (3), a mass ratio of the gasifiable organic carbon source to the pulverized material is (0.02-0.5): 1.

* * * * *